United States Patent
Freudiger et al.

(10) Patent No.: US 9,477,839 B2
(45) Date of Patent: Oct. 25, 2016

(54) METHODS FOR CENTRALIZED PRIVACY-PRESERVING COLLABORATIVE THREAT MITIGATION

(71) Applicant: Palo Alto Research Center Incorporated, Palo Alto, CA (US)

(72) Inventors: Julien F. Freudiger, Mountain View, CA (US); Emiliano De Cristofaro, London (GB); Alejandro E. Brito, Mountain View, CA (US); Marshall W. Bern, San Carlos, CA (US); Ersin Uzun, Campbell, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 287 days.

(21) Appl. No.: 14/245,778

(22) Filed: Apr. 4, 2014

(65) Prior Publication Data

US 2015/0286825 A1    Oct. 8, 2015

(51) Int. Cl.
*G06F 21/60*     (2013.01)
*H04L 9/06*      (2006.01)
*H04L 29/06*     (2006.01)

(52) U.S. Cl.
CPC ............. *G06F 21/60* (2013.01); *H04L 9/0637* (2013.01); *H04L 63/0428* (2013.01); *H04L 63/14* (2013.01)

(58) Field of Classification Search
CPC ..... G06F 21/60; H04L 9/0637; H04L 63/14; H04L 63/0428
USPC .......................................................... 726/26
See application file for complete search history.

(56) References Cited

U.S. PATENT DOCUMENTS

| | | | |
|---|---|---|---|
| 9,191,196 B2* | 11/2015 | Raykova | H04L 9/008 |
| 2013/0010950 A1* | 1/2013 | Kerschbaum | H04L 9/008 380/30 |
| 2013/0086553 A1* | 4/2013 | Grechanik | G06F 8/71 717/123 |
| 2015/0135262 A1* | 5/2015 | Porat | H04L 63/145 726/1 |

OTHER PUBLICATIONS

Efficient Robust Private Set Intersection Dana Dachman-Soled, Tal Malkin, Mariana Raykova, and Moti Yung Columbia University ACNS 2009, LNCS 5536, pp. 125-142, 2009.*

* cited by examiner

*Primary Examiner* — Kambiz Zand
*Assistant Examiner* — Benjamin Kaplan
(74) *Attorney, Agent, or Firm* — Shun Yao; Park, Vaughan, Fleming & Dowler LLP (57) ABSTRACT

One embodiment of the present invention provides a system to facilitate collaboration for mitigating network threats. During operation, the system receives encrypted data sets from a plurality of entities. The data sets including data describing threats to network security. The system performs privacy-preserving operations on the encrypted data sets, such as private set intersection. The system then computes one or more metrics based on results of the private set intersection computations. The system may generate a similarity matrix based on the one or more metrics, and returns one or more similarity values from the similarity matrix to one or more entities of the plurality of entities.

21 Claims, 5 Drawing Sheets

METHODS FOR CENTRALIZED PRIVACY-PRESERVING COLLABORATIVE THREAT MITIGATION

RELATED APPLICATION

The subject matter of this application is related to the subject matter of the following application:

U.S. patent application Ser. No. 14/101,148, entitled "METHOD AND APPARATUS FOR PRIVACY AND TRUST ENHANCING SHARING OF DATA FOR COLLABORATIVE ANALYTICS," by inventors Emiliano De Cristofaro, Julien F. Freudiger, Ersin Uzun, Alejandro E. Brito, and Marshall W. Bern, filed Dec. 9, 2013; and U.S. patent application Ser. No. 14/245,498, entitled "METHODS FOR SELECTION OF COLLABORATORS FOR ONLINE THREAT MITIGATION," by inventors Julien F. Freudiger, Emiliano De Cristofaro, Alejandro E. Brito, Marshall W. Bern, and Ersin Uzun, filed 4 Apr. 2014;

the disclosure of which is incorporated by reference in its entirety herein.

BACKGROUND

1. Field

The present disclosure relates to private collaborative analytics. More specifically, this disclosure relates to a method and system that facilitates privacy-preserving centralized computation of similarity values for collaborative threat mitigation.

2. Related Art

Organizations today are exposed to an increasingly large number of cyber threats, including malware and software vulnerabilities as well as botnet, zeroday, and denial of service attacks. In compliance with risk management frameworks, industry practices usually recommend implementation of standard security countermeasures, such as firewalls, antivirus software, patch management, and security/log audits.

Some security solutions go beyond passive defense mechanisms and offer proactive measures to predict attackers' next move. Prediction techniques rely on attack information—so-called "security data"—that companies retain: Internet Protocol (IP) addresses, domains, Uniform Resource Locators (URLs), hostnames, vulnerabilities, phishing emails, metadata (e.g., attack technique, malware, activity description), incident parameters, Threats Techniques and Procedures (TTPs), etc. The more security data a company has, the better the understanding of adversarial strategies and thus the success of its prediction techniques.

Threat modeling requires as much information as possible about threats but information is usually scarce. In practice, companies have a limited view of malicious cyber activities and can only achieve limited prediction performance. Previous work showed that collaboration would curb this challenge as companies are often hit by the same attacks (see, e.g., Zhang, J. and Porras, P. and Ulrich, J. Highly Predictive Blacklisting. Proceedings of Usenix Security, 2008). Therefore, companies can enhance the accuracy of security intelligence and analytics mitigation techniques if companies share security data with each other, thereby increasing the availability of information about attacks.

Unfortunately, a number of problems often prevent companies from sharing security data. Companies may need to determine which other companies they should partner with. To do so, they compare the expected benefits of collaborating with different companies. However, it may be inefficient for each company to separately determine the expected benefits because of the computations required. Without an effective process for determining the expected benefits from collaborating, the companies might not be able to benefit from collaborating and sharing security data.

SUMMARY

One embodiment of the present invention provides a system to facilitate collaboration for mitigating network threats. During operation, the system receives encrypted data sets from a plurality of entities. The data sets including data describing threats to network security. The system performs privacy-preserving operations on the encrypted data sets, such as private set intersection. The system then computes one or more metrics based on results of the private set intersection computations. The system may generate a similarity matrix based on the one or more metrics, and returns one or more similarity values from the similarity matrix to one or more entities of the plurality of entities.

In a variation on this embodiment, the system sends an encryption key to a number of organizations, and receives data sets describing security threats encrypted using the encryption key.

In a further variation, the received data sets are each a randomly ordered sample of a respective organization's entire data set.

In a variation on this embodiment, the system removes an organization from a set of potential collaborating organizations if data set contributions from the organization drop beyond a predetermined threshold.

In a variation on this embodiment, the system performs private set intersection involving comparing cipher texts.

In a variation on this embodiment, the similarity matrix includes one of Pearson, Jaccard, intersection, and/or cosine matrix values.

In a variation on this embodiment, the system sends one row or column of metric values from the similarity matrix to an entity that provided encrypted data sets.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of efficiently computing similarity values in a privacy-preserving way for collaborative threat mitigation by allowing organizations in a group to send their data sets to a central authority that computes the similarity values. The similarity values are the expected benefits of collaboration between each pair of organizations. The central authority sends the similarity values back to the organizations after performing the computations. Each organization can then utilize the similarity values to order the other organizations and choose its preferred collaborating partners. For example, an organization A may receive similarity value data indicating that the expected benefit of collaborating with another organization B is greater than the expected benefit of collaborating with a different organization C. Organization A can then seek to collaborate with organization B as a preferred partner.

The central authority may estimate the expected benefit of collaboration using techniques as described in U.S. patent application Ser. No. 14/101,148, titled "Method and Apparatus for Privacy and Trust Enhancing Sharing of Data for Collaborative Analytics," the disclosure of which is incorporated herein in its entirety. Some similarity values the central authority can provide include, for example, an intersection of data sets, a size of intersection of data sets, a size of a union of data sets, and a Jaccard index value.

Examples of how the organizations may utilize similarity values to establish partnerships are described in U.S. patent application Ser. No. 14/245,498, titled "Methods for Selection of Collaborators for Online Threat Mitigation," the disclosure of which is incorporated herein in its entirety. In some implementations, each organization in a set of n organizations may use the similarity values to generate an ordered list of other organizations that it wants to collaborate with. The organizations can each establish a preference list of partners to determine preferred collaborating relationships. The set of n organizations can be represented as $C=\{c_1, \ldots, c_n\}$. The organizations are each associated with a data set $S=\{S_1, \ldots, S_n\}$. The ordered list is also called a preference list. An organization may rank other organizations by the expected benefits of collaboration. This collaboration can involve exchanging security data. Each organization has its own data set, and the organizations seek to obtain the most benefits from sharing their security data.

The centralized computation of similarity values facilitates monitoring of participation across organizations. It helps thwart misbehavior from malicious organizations. The central authority is semi-trusted. It has access only to the encrypted data, and cannot determine the actual unencrypted data being compared. The central authority may gather information including general statistics about data contributions, and has incentives to serve as a coordination point (e.g., if two cipher texts are equal, the central authority may determine that the underlying encrypted data are the same). Organizations can detect malicious central authorities. For example, if a central authority sends false data regarding intersection sizes, the organizations can detect the false data during their peer-to-peer computations.

Note that the techniques discussed herein are related to a broader framework for privacy-preserving secure collaboration and data sharing as disclosed in U.S. patent application Ser. No. 14/101,148, titled "Method and Apparatus for Privacy and Trust Enhancing Sharing of Data for Collaborative Analytics," the disclosure of which is incorporated herein in its entirety. U.S. patent application Ser. No. 14/101,148 discloses techniques to facilitate establishment of trust through privacy-preserving identification of sharing partners in real-time, and reduces competitive risk through controlled and limited data sharing. This disclosure adds to the techniques that organizations may use to facilitate data sharing and mitigate online threats.

Figure 1:
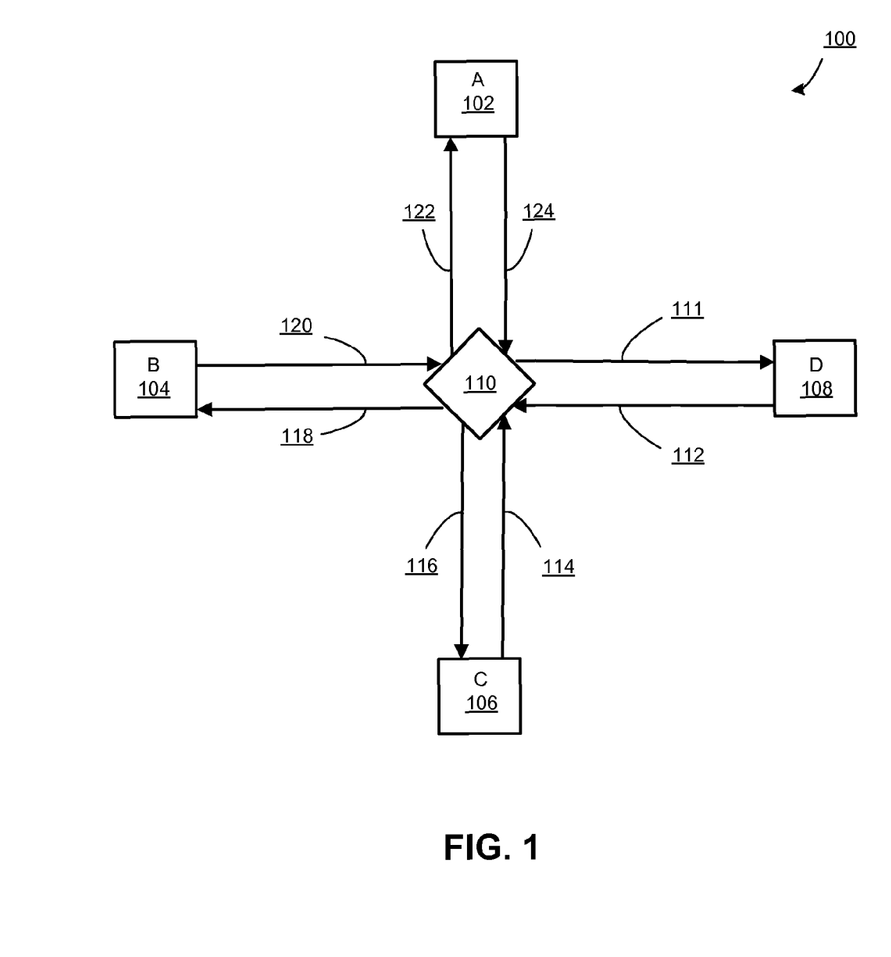
FIG. 1 presents a block diagram illustrating an exemplary context of a system that facilitates collaboration to mitigate threats, according to an embodiment.
Figure 2:
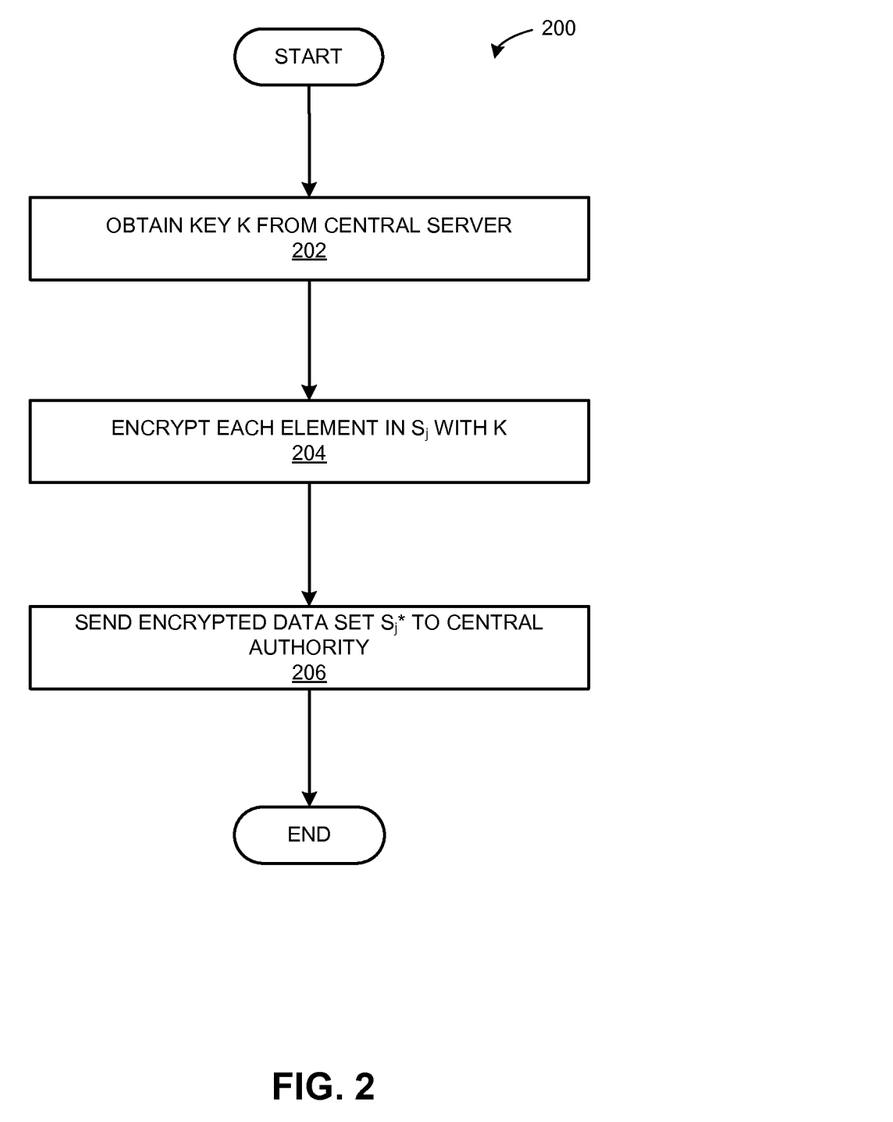
FIG. 2 presents a flowchart illustrating an exemplary process for encrypting and sending data to the central authority, according to an embodiment.
Figure 3:
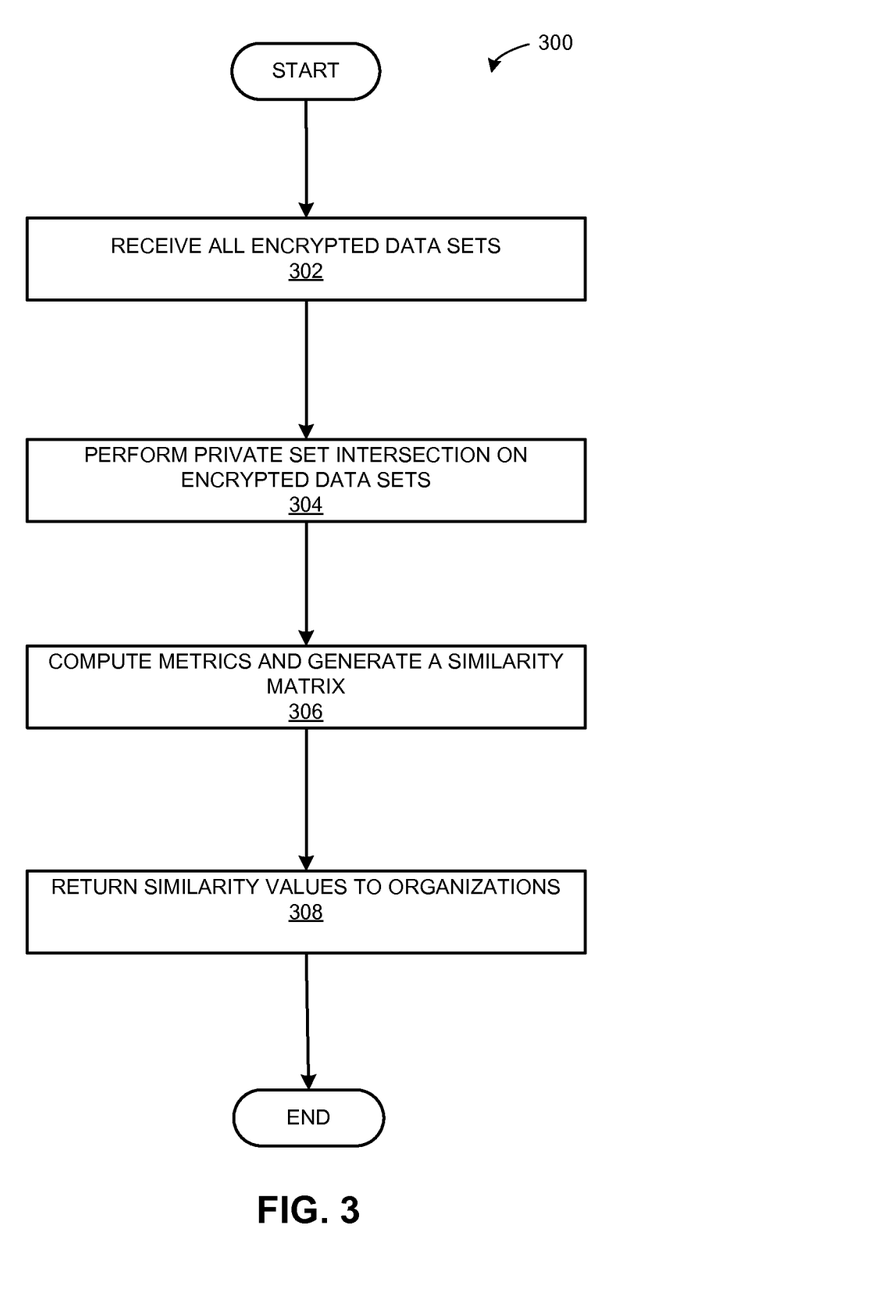
FIG. 3 presents a flowchart illustrating an exemplary process for privacy-preserving centralized computation of similarity values, according to an embodiment.
Figure 4:
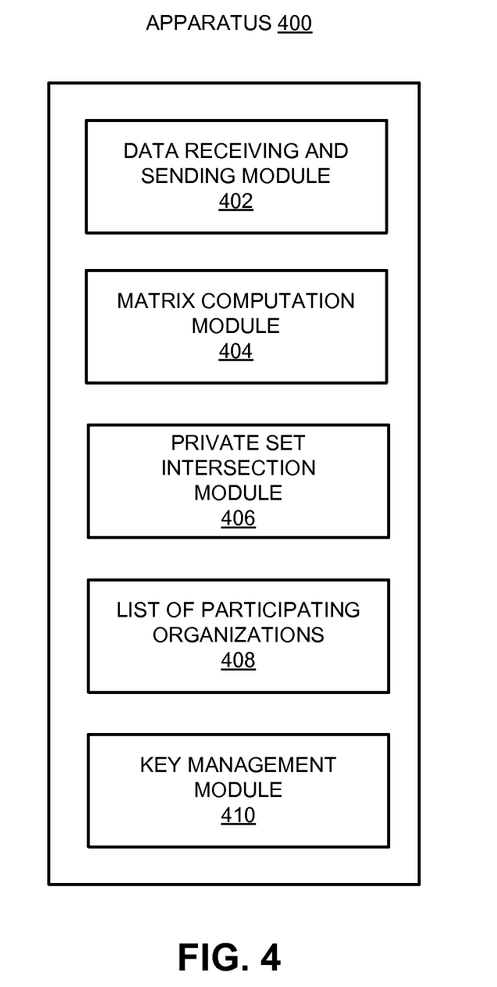
FIG. 4 presents a block diagram illustrating an exemplary apparatus for a central authority that facilitates collaboration to mitigate threats, in accordance with an embodiment.
Figure 5:
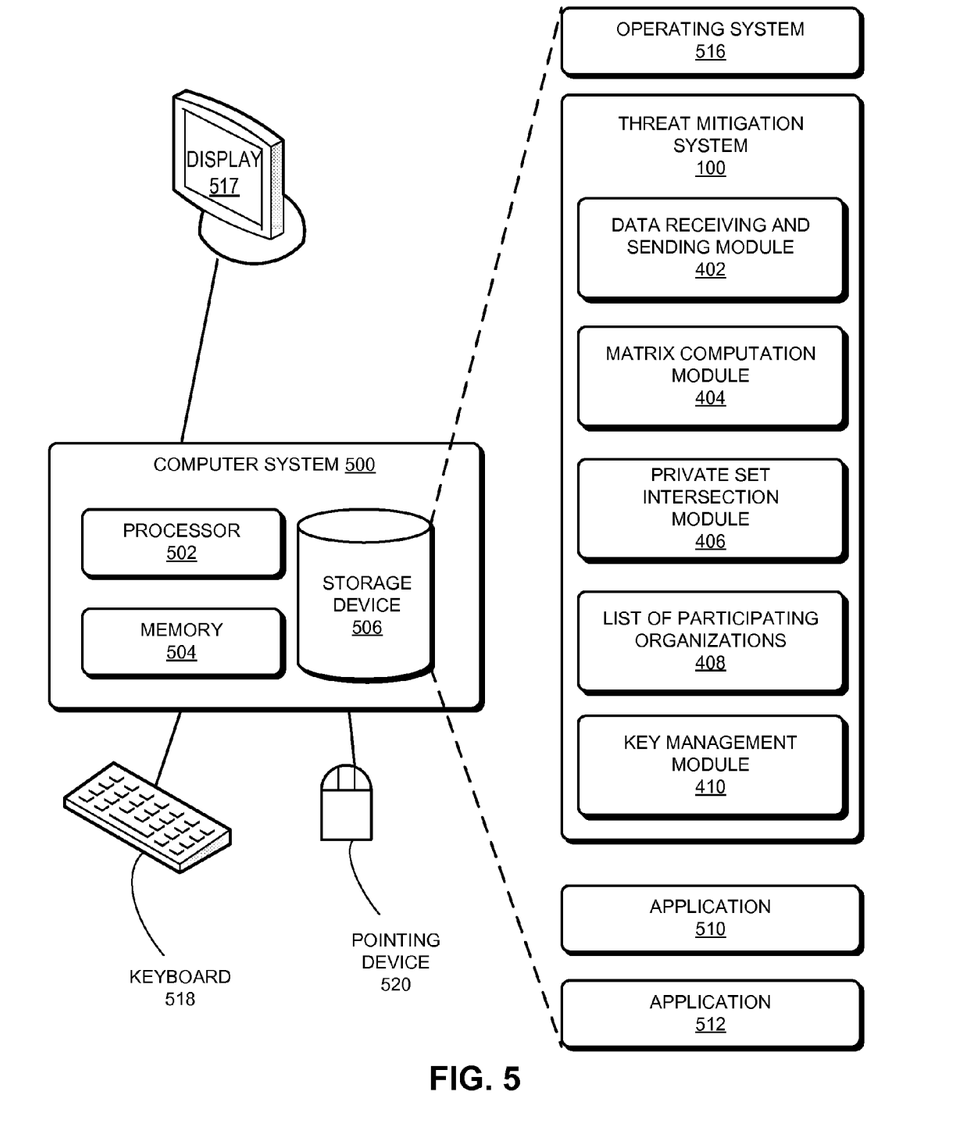
FIG. 5 illustrates an exemplary computer system for a central authority that facilitates collaboration to mitigate threats, in accordance with an embodiment.

In the disclosure below, FIG. 1 presents a block diagram illustrating an exemplary context of a system that facilitates collaboration to mitigate threats. FIG. 2 presents a flowchart illustrating an exemplary process for encrypting and sending data to the central authority. FIG. 3 presents a flowchart illustrating an exemplary process for centralized computation of similarity values. FIG. 4 presents a block diagram illustrating an exemplary apparatus to facilitate collaboration to mitigate threats. FIG. 5 illustrates an exemplary computer system that facilitates collaboration to mitigate threats.

Exemplary Context

FIG. 1 presents a block diagram illustrating an exemplary context of a system that facilitates collaboration to mitigate threats, according to an embodiment. As depicted in FIG. 1, a context in which a threat mitigation system 100 operates may include organizations (e.g., organizations A-D 102-108) that may choose to share security data with each other. The lines 111-124 connecting the organizations with a central authority 110 indicate that the organizations may send data to and receive data from the central authority 110. For example, line 112 indicates that organization D may send an encrypted data set to central authority 110. Line 111 indicates that central authority 110 sends similarity values to organization D 108.

These organizations choose collaborating partners in a selective manner. The organizations each prefer to collaborate with other organizations that can benefit them the most. The organizations can compute the expected benefit of collaborating with each other according to some agreed-upon metric. For example, organization A 102 can compute the expected benefit of collaborating with each of organizations B 104 to D 108, and organization B 104 can compute the expected benefit of collaborating with organization A 102 and each of organizations C 106 to D 108.

There are a number of metrics for estimating the benefits of sharing security log data with another organization while maintaining the confidentiality of the data. For example, an organization can determine the dataset size of a potential partner, and if that size is approximately equal to the size of the organization's own data set, then the organization may choose the potential partner for sharing security log data. As another example, the organization may choose a potential partner if the potential partner's data set and the organization's data set share a number of common data elements exceeding a predetermined threshold. These benefits, or similarity values, may be computed among organizations themselves. However, it may be more efficient for the organizations to send their data sets to central authority 110 to compute the similarity values.

The central authority 110 may compute the similarity values in a privacy-preserving way for the organizations. The process for collecting data and computing the similarity values is described in greater detail in FIG. 2 and FIG. 3.

With the central authority performing the similarity value computations, the number of interactions grows at a rate of O(n), where n is the number of organizations. This is more efficient than requiring the organizations to compute the similarity values themselves, for which the number of interactions grows at a rate of $O(n^2)$.

In some implementations, organizations may each generate a preference list of their preferred collaborating partners according to the expected benefits. For example, organization A 102 may determine that it wants to collaborate with one or more other organizations. Organization A 102 may estimate the benefits of collaborating with organizations B 104, C 106, and D 108. Organization A 102 may determine that its preference list includes organizations B 104, D 108, and C 106, in order of preference. That is, organization A 102 prefers to collaborate with organization B 104 the most because organization A 102 estimates that collaborating with organization B 104 provides the most expected benefit.

Organization A 102 may collaborate with other organizations to exchange data such as security log data, including data describing malicious attacks. Security log data is data stored in a log that describes network security-related activity, such as network attacks. The security logs may store data describing intrusion detection events or other network attacks by malicious attackers and/or data describing any other security-related events from any IP address. This information may include IP addresses of malicious attackers.

To improve their respective network security, organizations may utilize the techniques discussed herein to find collaborating partners and share the security log data with each other in real-time. The organizations may share security data to improve and/or update the detection and prediction of network threats and/or to gain a better understanding of past or present attacks, and/or to improve any other network security measures.

Note that each of the organizations may deploy an internal network that includes a router and a plurality of computers. The organizations' routers may share security log data with each other over a network. The organizations may share their security log data with each other through their respective routers, although different implementations may utilize different types of devices to share security log data. Also, the one or more devices implementing the techniques disclosed herein may also be referred to as the system. Besides routers exchanging security log data, embodiments of the present invention may utilize any computers and/or other machines to exchange threat information.

Any number of organizations or parties can select partners for exchanging data using the techniques disclosed herein. Some organizations may run their software as cloud applications. For these organizations, a cloud node can collect threat information and share the information with other organizations.

Process Performed by Potential Collaborators

FIG. 2 presents a flowchart illustrating an exemplary process for encrypting and sending data to the central authority, according to an embodiment. FIG. 2 and the accompanying text describe a process executed by each organization. FIG. 3 and the accompanying text describe a process executed by the central authority. The text below describes the process as performed by organization A 102, but all the organizations perform a similar process.

In the flowchart of FIG. 2, organization A 102 initially obtains a key K from central authority 110 (operation 202). The central authority 110 may generate a key K and share it with organizations, or use any group key establishment process to generate the key together with the organizations. In this case, the central authority 110 must then delete the key K in order to guarantee that it cannot know the content of encrypted messages. Alternatively, it might be desirable for the central authority 110 not to know the key at all. Organizations may then generate the key using group key establishment process among each other such as group key Diffie-Hellman, or one organization may pick the key and share it with others (but not with the central authority).

Organization A 102 may select a data set $S_j$ to compare with other organizations, encrypt the data set, shuffle it, and send it to the central authority. Organization A 102 may encrypt each element in a data set $S_j$ with key K (operation 204). For example, organization A 102 may encrypt $x_1 \in S_j$ with key K to generate $y_1$. Organization A 102 may encrypt each element in $S_j$ with key K using a deterministic symmetric key encryption scheme such as Advanced Encryption Standard (AES) in Cipher Block Chaining (CBC) mode with deterministic IV: $S_j^* = AES\_Enc_K[S_j]$. Shuffling includes re-ordering at random elements in the dataset.

In some implementations, instead of sending the entire data set $S_j$ to the central authority, the organizations send only a sample of their respective data sets. For this scenario, organization A 102 may sample its original data set $S_j$ to generate $S'_j$. $S'_j$ is a subset of the entire data set. Organization A 102 can sample uniformly at random a predetermined percentage of elements from the original data set $S_j$. For example, organization A 102 can sample a predetermined percentage of 10% of the elements from the original data set $S_j$. Organization A 102 may then encrypt each element in the subset $S'_j$ with key K. For example, organization A 102 may encrypt $x_1 \in S'_j$ with key K to generate $y_1$. Organization A 102 may encrypt each element in $S'_j$ with key K using a deterministic symmetric key encryption scheme such as AES in CBC mode with deterministic IV: $S_j^* = AES\_Enc_K[S'_j]$. Note that the sampling significantly reduces transmission overhead. For example, with 10% sampling, each organization only uploads 10% of its respective data set to the central authority.

Organization A 102 may subsequently send the encrypted data set $S_j^*$ to central authority 110 (operation 206). Central authority 110 then performs all similarity value computations.

Centralized Computation of Similarity Values

FIG. 3 presents a flowchart illustrating an exemplary process for privacy-preserving centralized computation of similarity values, according to an embodiment. FIG. 3 illustrates one possible implementation, and specific details may vary according to implementation.

During operation, central authority 110 may initially receive all the encrypted data sets $S^* = \{S_1^*, \ldots, S_n^*\}$ from the organizations (operation 302). Central authority 110 may perform private set intersection on the encrypted data sets (operation 304). Central authority 110 may compare encrypted values among the data sets. If two cipher texts are equal, then there is an intersection between two data sets. For example, organization A 102 may encrypt data $x_1$ with key K to generate $y_1$, and organization B 104 may also encrypt data $x_1$ with key K to generate $y_1$. When central authority 110 receives $y_1$ from both organization A 102 and organization B 104, central authority 110 may compute the private set intersection using the encrypted values.

Central authority 110 can analyze, for example, an intersection of data sets, a size of intersection of data sets, a size of a union of data sets, or a Jaccard index value to determine the expected benefits. Central authority 110 may estimate the expected benefits by using techniques described in U.S. patent application Ser. No. 14/101,148, titled "Method and Apparatus for Privacy and Trust Enhancing Sharing of Data for Collaborative Analytics," the disclosure of which is incorporated herein in its entirety.

Central authority 110 may compute metric values using intersection values and generate a similarity matrix (operation 306). The similarity matrix M may be as follows:

$$M = \begin{bmatrix} m_{1,1} & \cdots & m_{1,n} \\ \vdots & \ddots & \vdots \\ m_{n,1} & \cdots & m_{n,n} \end{bmatrix}$$

The similarity values can be any metric, such as Intersection Size, Jaccard, Pearson, and Cosine metrics. Central authority 110 may then return the similarity values to the organizations (operation 308). Each organization should receive one row or column of the matrix as their similarity values. For example, central authority 110 may return row 1 of the matrix above to an organization $c_1$. If the metric used is Intersection Size, organizations obtain set intersection cardinality, i.e., how many attacks they have in common with specific other organizations. In addition, the central authority 110 may share intersected ciphertexts, and enable organizations to learn which attacks they have in common.

The organizations can then utilize the similarity values to determine whether to collaborate with one another. For example, organization A 102 may order the other organizations according to similarity value in order to choose a collaborating partner. Additional details for how the organizations may utilize the similarity values to choose a collaborating partner are disclosed in U.S. patent application Ser. No. 14/245,498, titled "Methods for Selection of Collaborators for Online Threat Mitigation," the disclosure of which is incorporated herein in its entirety.

In some implementations, central authority 110 may implement a policy to removing an organization from a set of potential collaborating organizations if data contributions from the organization drop beyond a predetermined threshold. For example, if organization A 102 reduces its contribution of data beyond a predetermined threshold, central authority 110 may remove organization A 102 from the set. In some implementations, central authority 110 may also add a new organization to the set of potential collaborating organizations.

Exemplary Apparatus

FIG. 4 presents a block diagram illustrating an exemplary apparatus 400 for a central authority that facilitates collaboration to mitigate threats, in accordance with an embodiment. Apparatus 400 can comprise a plurality of modules which may communicate with one another via a wired or wireless communication channel. Apparatus 400 may be realized using one or more integrated circuits, and may include fewer or more modules than those shown in FIG. 4. Further, apparatus 400 may be integrated in a computer system, or realized as a separate device which is capable of communicating with other computer systems and/or devices.

Specifically, apparatus 400 can comprise a data receiving and sending module 402, a matrix computation module 404, a private set intersection module 406, a list of participating organizations 408, and a key management module 410. Note that apparatus 400 may also include additional modules and data not depicted in FIG. 4, and different implementations may arrange functionality according to a different set of modules. Embodiments of the present invention are not limited to any particular arrangement of modules.

Data receiving and sending module 402 receives data sets from the organizations and sends collaboration and threat mitigation data, such as similarity values, back to the organizations. Matrix computation module 404 computes the similarity values for the matrix. Private set intersection module 406 performs private set intersection computations. Apparatus 400 may maintain the list of participating organizations 408. Key management module 410 may generate and manage encryption keys.

Exemplary Computer System

FIG. 5 illustrates an exemplary computer system 500 for a central authority that facilitates collaboration to mitigate threats, in accordance with an embodiment. Computer system 500 can be an example of a specialized computer system that provides threat mitigation functionality in some implementations. In one embodiment, computer system 500 includes a processor 502, a memory 504, and a storage device 506. Storage device 506 stores a number of applications, such as applications 510 and 512 and operating system 516. Storage device 506 also stores threat mitigation system 100, which includes data receiving and sending module 402, matrix computation module 404, private set intersection module 406, list of participating organizations 408, and key management module 410. During operation, one or more applications, such as matrix computation module 404, are loaded from storage device 506 into memory 504 and then executed by processor 502. While executing the program, processor 502 performs the aforementioned functions. Computer and communication system 500 may be coupled to an optional display 517, keyboard 518, and pointing device 520.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method to facilitate privacy-preserving collaboration for mitigating network threats performed by a server, comprising:
   receiving, at the server, an encrypted data set from each entity of a plurality of entities, wherein a respective encrypted data set includes a respective encrypted data describing threats to network security;
   performing, by the server, a metric-computing operation for each entity of the plurality of entities, which involves performing the metric-computing operation on a respective entity's encrypted data set with the encrypted data set of other entities in the plurality of entities to compute metric values, with a respective metric value corresponding to a respective entity of the other entities in the plurality of entities;
   generating, by the server for each entity of the plurality of entities, a similarity matrix based on the metric values, wherein a respective row or column in the similarity matrix includes metric values computed from performing the metric-computing operation with a respective entity's encrypted data set and encrypted data sets of other entities of the plurality of entities; and
   returning, by the server, a row or column of metric values from the similarity matrix to each entity of the plurality of entities.

2. The method of claim 1, wherein the entities are organizations, further comprising:
   sending an encryption key to a number of organizations;
   deleting the encryption key; and
   receiving encrypted data sets describing security threats that are encrypted using the encryption key.

3. The method of claim 1, wherein the received data sets are each a randomly ordered sample of a respective organization's entire data set.

4. The method of claim 1, further comprising:
   removing an organization from a set of potential collaborating organizations if data set contributions from the organization drop beyond a predetermined threshold.

5. The method of claim 1, wherein performing the metric-computing operation comprises performing private set intersection that involves comparing cipher texts.

6. The method of claim 1, wherein the similarity matrix includes one of Pearson, Jaccard, intersection size, and cosine matrix values.

7. The method of claim 1, further comprising:
   sending ciphertexts used in the computation of each metric value.

8. A non-transitory computer-readable storage medium storing instructions that when executed by a computer cause the computer to perform a method to facilitate privacy-preserving collaboration for mitigating network threats, the method comprising:
   receiving, at a server, an encrypted data set from each entity of a plurality of entities, wherein a respective encrypted data set includes a respective encrypted data describing threats to network security;
   performing, by the server, a metric-computing operation for each entity of the plurality of entities, which involves performing the metric-computing operation on a respective entity's encrypted data set with the encrypted data set of other entities in the plurality of entities to compute metric values, with a respective metric value corresponding to a respective entity of the other entities in the plurality of entities;
   generating, by the server for each entity of the plurality of entities, a similarity matrix based on the metric values, wherein a respective row or column in the similarity matrix includes metric values computed from performing the metric-computing operation with a respective entity's encrypted data set and encrypted data sets of other entities of the plurality of entities; and
   returning, by the server, a row or column of metric values from the similarity matrix to each entity of the plurality of entities.

9. The non-transitory computer-readable storage medium of claim 8, wherein the entities are organizations and the method further comprises:
   sending an encryption key to a number of organizations;
   deleting the encryption key; and
   receiving encrypted data sets describing security threats that are encrypted using the encryption key.

10. The non-transitory computer-readable storage medium of claim 8, wherein the received data sets are each a randomly ordered sample of a respective organization's entire data set.

11. The non-transitory computer-readable storage medium of claim 8, wherein the method further comprises:
   removing an organization from a set of potential collaborating organizations if data set contributions from the organization drop beyond a predetermined threshold.

12. The non-transitory computer-readable storage medium of claim 8, wherein performing the metric-computing operation comprises performing private set intersection that involves comparing cipher texts.

13. The non-transitory computer-readable storage medium of claim 8, wherein the similarity matrix includes one of Pearson, Jaccard, intersection size, and cosine matrix values.

14. The non-transitory computer-readable storage medium of claim 8, wherein the method further comprises:
   sending ciphertexts used in the computation of each metric value.

15. A computing system to facilitate privacy-preserving collaboration for mitigating network threats performed by a server, the system comprising:
   one or more processors,
   a non-transitory computer-readable medium coupled to the one or more processors having instructions stored thereon that, when executed by the one or more processors, cause the one or more processors to perform operations comprising:
   receiving, at the server, an encrypted data set from each entity of a plurality of entities, wherein a respective encrypted data set includes a respective encrypted data describing threats to network security;
   performing, by the server, a metric-computing operation for each entity of the plurality of entities, which involves performing the metric-computing operation on a respective entity's encrypted data set with the encrypted data set of other entities in the plurality of entities to compute metric values, with a respective metric value corresponding to a respective entity of the other entities in the plurality of entities;
   generating, by the server for each entity of the plurality of entities, a similarity matrix based on the metric values, wherein a respective row or column in the similarity matrix includes metric values computed from performing the metric-computing operation with a respective entity's encrypted data set and encrypted data sets of other entities of the plurality of entities; and
   returning, by the server, a row or column of metric values from the similarity matrix to each entity of the plurality of entities.

16. The computing system of claim 15, wherein the entities are organizations, and the operations further comprise:
  sending an encryption key to a number of organizations;
  deleting the encryption key; and
  receiving encrypted data sets describing security threats that are encrypted using the encryption key.

17. The computing system of claim 15, wherein the received data sets are each a randomly ordered sample of a respective organization's entire data set.

18. The computing system of claim 15, wherein the operations further comprise:
  removing an organization from a set of potential collaborating organizations if data set contributions from the organization drop beyond a predetermined threshold.

19. The computing system of claim 15, wherein performing the metric-computing operation comprises performing private set intersection that involves comparing cipher texts.

20. The computing system of claim 15, wherein the similarity matrix includes one of Pearson, Jaccard, intersection size, and cosine matrix values.

21. The computing system of claim 15, wherein the operations further comprise:
  sending ciphertexts used in the computation of each metric value.

* * * * *